(12) United States Patent
Hoogerbrugge

(10) Patent No.: US 7,577,827 B2
(45) Date of Patent: Aug. 18, 2009

(54) DATA PROCESSOR WITH MULTI-COMMAND INSTRUCTION WORDS

(75) Inventor: Jan Hoogerbrugge, Eindhoven (NL)

(73) Assignee: NXP B.V., Eindhoven (NL)

( * ) Notice: Subject to any disclaimer, the term of this patent is extended or adjusted under 35 U.S.C. 154(b) by 807 days.

(21) Appl. No.: 09/794,943

(22) Filed: Feb. 28, 2001

(65) Prior Publication Data

US 2001/0020265 A1 Sep. 6, 2001

(30) Foreign Application Priority Data

Feb. 28, 2000 (EP) .................................. 00200679

(51) Int. Cl.
*G06F 9/00* (2006.01)
*G06F 9/30* (2006.01)
(52) U.S. Cl. .................... 712/239; 712/238; 712/240
(58) Field of Classification Search .................. 712/34, 712/238, 239, 240
See application file for complete search history.

(56) References Cited

U.S. PATENT DOCUMENTS

| | | | | |
|---|---|---|---|---|
| 4,833,599 A | | 5/1989 | Colwell et al. ............... 364/200 |
| 5,414,822 A | | 5/1995 | Saito et al. .................. 395/375 |
| 5,442,756 A | * | 8/1995 | Grochowski et al. ......... 712/238 |
| 5,584,001 A | * | 12/1996 | Hoyt et al. ................... 712/238 |
| 5,606,676 A | * | 2/1997 | Grochowski et al. ......... 712/239 |
| 5,774,710 A | * | 6/1998 | Chung ......................... 712/238 |
| 5,850,543 A | * | 12/1998 | Shiell et al. .................. 712/238 |
| 5,903,750 A | | 5/1999 | Yeh et al. ..................... 395/583 |
| 5,978,909 A | * | 11/1999 | Lempel ...................... 712/240 |
| 6,014,742 A | * | 1/2000 | Krick et al. .................. 712/236 |
| 6,157,988 A | * | 12/2000 | Dowling ..................... 711/140 |
| 6,304,962 B1 | * | 10/2001 | Nair ........................... 712/240 |

FOREIGN PATENT DOCUMENTS

EP 0737915 A1 10/1996

* cited by examiner

*Primary Examiner*—Aimee J Li

(57) ABSTRACT

A data processor that addresses instructions as groups of commands which may contain more than one branch command, such as VLIW instructions that contain several commands for parallel execution. The processor selects an expected taken branch command from the branch commands in a group. The processor also selects a tentative target for the expected taken branch command and tentatively redirects control flow to a further group of commands identified by the tentative target. The processor contains an associative target memory for storing targets of previously executed branch commands. Targets are retrieved with an associative address that identifies a command in the group, the tentative target being selected on the basis of a match between the associative address associated with the tentative target and an indication of the expected taken command.

8 Claims, 2 Drawing Sheets

DATA PROCESSOR WITH MULTI-COMMAND INSTRUCTION WORDS

The field of the invention is a data processor that addresses instructions as groups of commands that may contain more than one branch command.

VLIW processors have instructions that are made up of at least two commands for simultaneous execution by the processor. The commands in one instruction may include more than one branch command. An example of such a processor can be found in U.S. Pat. No. 4,833,599, which describes a way of giving effect to such multiple branch commands.

Branches cause delays in program execution. It is known to reduce these delays by means of branch prediction. With branch prediction, the processor tentatively decides whether to follow a branch before the condition of that branch has actually been tested. This allows for faster execution if the decision proves to be correct once the condition has been tested. To reduce the branch delay even further, the processor may store the target address of a branch, or the target instruction stored at that target address, in a branch target memory. When the branch is subsequently taken into execution again, the target address or the target instruction is loaded from target memory and applied to the processor, which uses it tentatively to proceed with execution.

U.S. Pat. No. 5,903,750 describes branch prediction for a processor that loads a bundle of several instructions from a cache line at once. The bundle may contain more than one branch instruction. Instead of handling branch prediction for these instructions separately, this publication handles the bundle as a single instruction, for which only one branch prediction is made.

An entry is made for the bundle in a branch target memory, the entry storing the target addresses of the different branch instructions in the bundle. One branch prediction is made for all branch instructions in the bundle, by predicting which of the branch instructions will determine the final result after executing all the branch instructions in the bundle. The target address for the predicted branch instruction is selected from the target addresses stored for the bundle and used for speculative execution.

For example, if there are three consecutive branch instructions in the bundle, three target addresses are stored for the bundle. If it is predicted that the first branch instruction will not be taken, but the second branch instruction will be taken, then the second branch target address for the bundle will be selected and the cache line containing that target address will be speculatively executed. This minimizes the delay needed to determine the next cache line from which a bundle must be fetched. However, memory for the branch target addresses of all branch instructions is reserved. This is inefficient if one or more branch instructions in the bundle are taken very infrequently.

An object of the invention is to provide an efficient mechanism for accessing the predicted target instruction resulting from execution of a plurality of branch commands.

Another object of the invention is to provide an efficient mechanism for accessing the target instruction of the predicted branch in a VLIW instruction that contains more than one branch command.

A further object of the invention is to improve the efficiency of branch prediction.

According to the invention a memory for branch targets is provided, either in the form of addresses or of instructions at those addresses. This memory is addressed with an associative address, using the position in the VLIW instruction of the predictedly taken branch command as part of the associative address. Thus, the processor has the freedom to store or not to store the branch target for each position in the instruction individually, independent of whether other branch targets are stored for commands at other positions. In comparison with storing branch targets per instruction, this reduces the number of branch targets that needs to be stored.

According to an embodiment of the invention, the memory for branch targets is set associative, containing sets of associations, where each association contains a branch target and a tag. The address of an instruction is used as an index to find the set in which the target is to be found. The branch target of a command in the instruction is stored in association with a tag that contains an identification of the position of the command. Upon execution of an instruction the address of the instruction is used to select the set and when it is predicted that a branch command is taken, the position of the predicted branch command is used to find an association with matching tag. During the delay needed for selecting the predicted command the set can already be accessed using the instruction address. This means that the associations from the set will be available sooner once the prediction becomes available of the position of the branch command that is expected to be taken.

In another embodiment of the invention, the processor has a branch history memory for storing statistical information of the outcome of instructions with branch commands, to predict the outcome of future instructions. The statistical information contains an identification of a state and on execution of an instruction the state for that instruction is updated, dependent on the previous state and the branch command from the instruction, if any, that is taken. The state represents the position of the branch command that is expected to be taken next time the instruction is executed and a saturating count of a number of executions of the branch command in which the branch is taken at that position. The state represents such a count only for the expected command, that is, only when there is a state transition to a different expected command a count for another command will start to become represented.

For example, the state for an instruction may represent that taking a branch as a result of a command at a certain position is expected. The state also represents a count of either 1 or 2 executions of that command where a branch is taken. If the branch is not taken when the instruction is executed and the state represents a count of 2, a transition will be made to a state where the command is still the expected command, but the count will go from 2 to 1. If the branch is not taken and the count is 1, a transition will be made to a state that represents that another branch command, if any, is the expectedly taken branch with a count of 1 for that other command.

These and other advantageous aspects of the processor according to the invention will be discussed in more detail using the following figures.

Figure 1:
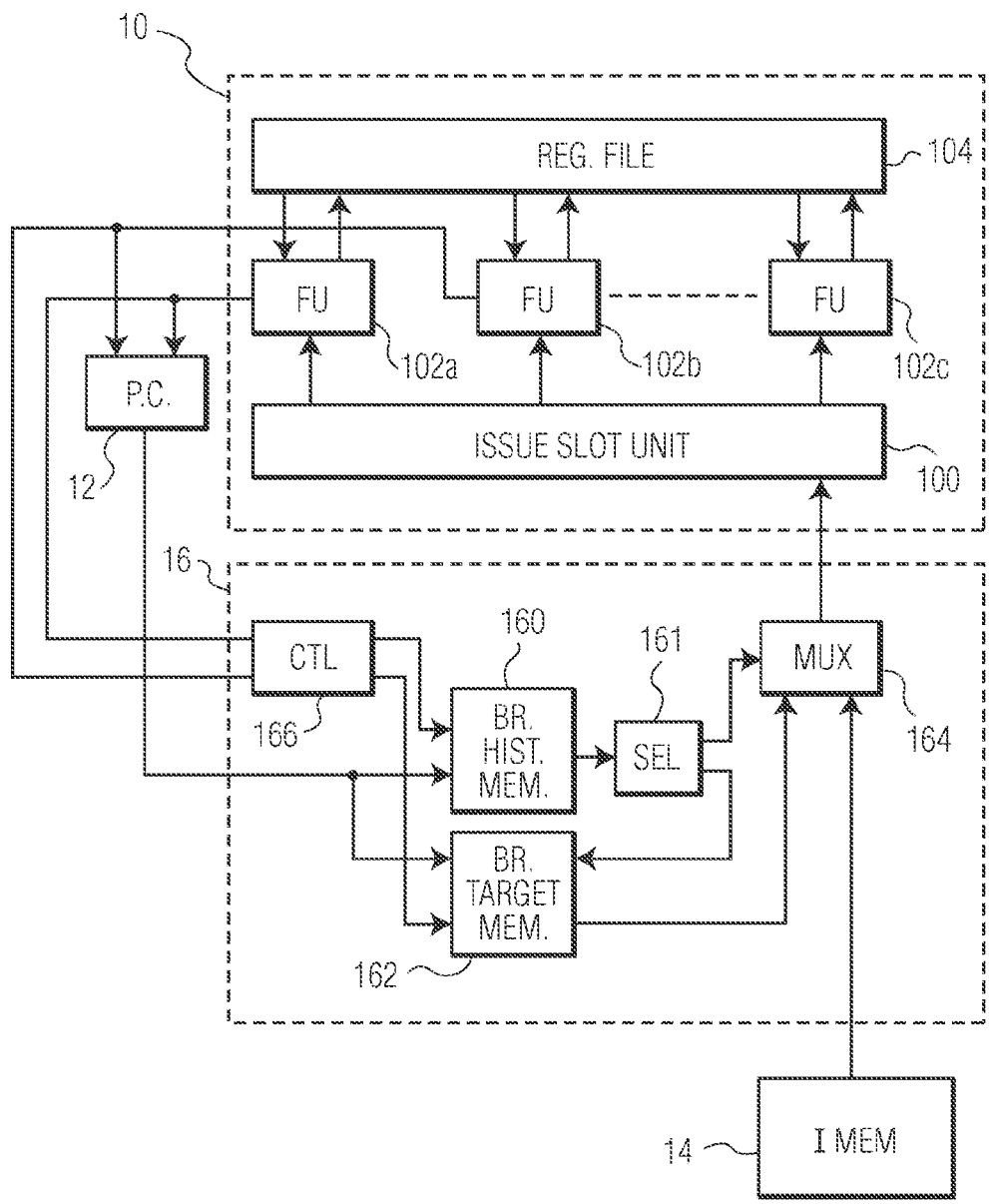
FIG. 1 shows a processor architecture

FIG. 1 shows a processor architecture. The architecture contains a processor 10, a program counter 12, an instruction memory 14 and a branch prediction unit 16. The program counter 12 is coupled to an address input of the instruction memory 14. The instruction memory 14 has an instruction output coupled to the processor 10 via branch prediction unit 16. The processor 10 has a branch output coupled to program counter 12 and branch prediction unit 16.

The processor 10 is shown as a VLIW processor, with an issue slot unit 100, a number of functional units 102a-c and a register file 104. Among the functional units 102a-c there are branch units, which have outputs coupled to the program counter 12 and the branch prediction unit 16. Optionally, several different functional units may be connected to the same issue slot, the instruction selecting which of the several functional units has to execute the command. In this case, one of the several functional units may be a branch unit, the others not being branch units, so that it depends on the instruction whether an issue slot can lead to a branch. The invention makes it possible to avoid storing a branch target for an issue slot of an instruction when the instruction does not select the branch unit connected to the issue slot.

The branch prediction unit 16 contains a branch history memory 160, a selection unit 161, a branch target memory 162, a multiplexer 164 and a control unit 166. Control unit 166 has an input coupled to the branch output of the processor 10. Control unit 166 has outputs coupled to the branch history memory 160 and the branch target memory 162. Branch history memory 160 has an output coupled to the selection unit 161. The selection unit 161 has outputs coupled to the branch target memory 162 and to a control input of multiplexer 164. Multiplexer 164 has inputs coupled to instruction memory 14 and to branch target memory 162.

In operation, instruction memory 14 contains a program of instructions. In the present case of a VLIW processor, each instruction is made up of a number of commands for different ones of the functional units 102a-c. Program counter 12 contains successive addresses of instructions to be fetched from instruction memory 14. In response to these addresses, instruction memory 14 outputs addressed instructions to processor 10. Processor 10 receives the instructions and distributes the commands from each instruction over the various functional units 102a-c.

If the command is a branch command and the functional unit 102a-c that executes this branch command determines that the branch should be taken, this is signaled to the program counter 12. The functional unit 102a-c signals the decision that the branch should be taken and the target address of the branch from which the next instruction should be fetched. When more than one functional unit 102a-c signals that a branch should be taken, program counter 12 uses some form of resolution to determine which of the branches should be taken. An example of such resolution is to assign an order of priority according to the functional unit 102a-c from which it is signaled that the branch should be taken.

Branches cause delays in program execution. This is particularly so for pipelined processors, which perform different stages of command execution in parallel for consecutive instructions. Parallel execution speeds up execution time, but parallel execution is difficult if it is not known which instructions should be executed consecutively, as is the case following an instruction that contains one or more branch commands. It takes a number of execution stages to reach a decision which, if any, of the branch commands should be followed. During those stages it is not possible to decide with certainty which instructions should be executed following the instruction that contains one or more branch commands.

The branch prediction unit 16 caters for this problem by predicting which instructions should be executed after an instruction that contains one or more branch commands, before the processor 10 has actually been able to instruct the program counter 12 about the result of the branch commands. The processor 10 tentatively executes the predicted instructions without committing itself to any irreversible action, such as overwriting data, until the outcome of the instruction with the branch commands has been decided.

The branch prediction unit 16 predicts the instructions using branch history information and branch target information, from branch history memory 160 and branch target memory 162 respectively. The branch history information represents statistical information about the frequency with which the one or more branch commands from the instruction have led to a change in the program counter 12 before. Selection unit 161 uses this information to generate a decision whether a taken branch should be predicted and which of the branch commands in the instruction is the taken branch whose target address will affect the program counter 12.

Selection unit 161 signals the decision to multiplexer 164. Normally, multiplexer 164 passes the instruction from instruction memory 14 to processor 10, but if the selection unit signals that a taken branch has been predicted, multiplexer 164 passes an instruction from branch target memory 162 instead.

Branch target memory 162 contains copies of target instructions that are located at the addresses that are targets of branch commands. These copies are stored so that each instruction can be retrieved given the address of the source instruction that contains the branch command and an indication of the position of the branch command in the source instruction. Alternatively, only the addresses of the target instructions may be stored in branch target memory, so that they can be retrieved from instruction memory 14 (additional circuitry for this alternative not shown in FIG. 1).

Branch target memory 162 receives the address of the source instruction that contains one or more branch commands (this address is available from the program counter) and an indication of the position of the selected branch command in that source instruction, as selected by selection unit 161. With this information branch target memory retrieves the target instruction (or its address) for that branch command (if available in branch target memory 162). The target instruction is applied to multiplexer 164, to be passed to processor 10 when selection unit 161 indicates to multiplexer 164 that it expects a branch to be taken. Thus, processor 10 is enabled to execute tentatively the predicted instruction. If no target instruction is available, branch target memory 162 signals this to multiplexer 164, which then passes the instruction from instruction memory 14.

FIG. 1 only shows the architectural parts that are used to explain how the branch target address is obtained. The skilled person will appreciate that known implementation details for using the branch target address, which are not shown in FIG. 1, such as the pipeline structure of processing architecture and the precise point of injection of the predicted instruction into the pipeline will be chosen as required by the needs of the processor 10, so as to minimize the number of empty pipeline stages. Similarly, circuitry to prevent irreversible actions in response to the predicted instruction as long as the branch command has not been finally decided is known to the skilled person and left out of FIG. 1 for reasons of clarity. The same holds for circuitry to restore the processor 10 to the correct state if the branch target is mispredicted.

Figure 2:
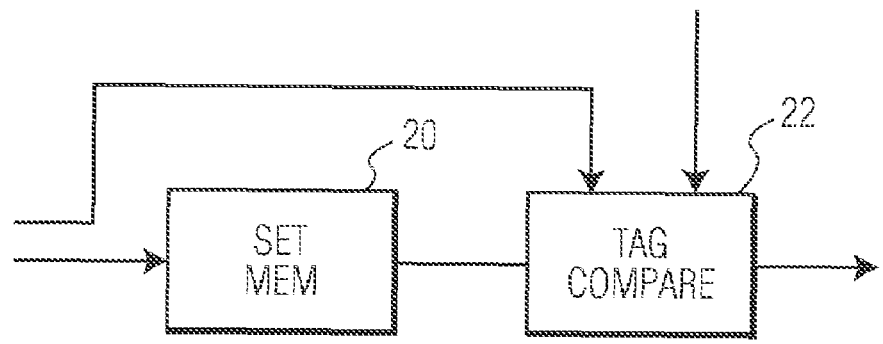
FIG. 2 shows a branch target memory

FIG. 2 shows an embodiment of the branch target memory 162. This embodiment shows a set associative implementation of the branch target memory. The embodiment contains a set memory 20 with an output coupled to a tag comparison unit 22. The set memory 20 is addressed by a first part of the address of the source instruction that contains one or more branch commands (this address is called the source address herein). The remaining part of the source address together with the indication of the selected branch command (as received from selection unit 161, not shown) is applied to tag comparison unit 22.

In operation, the first part of the source address selects a set of memory locations in set memory 20. Each memory location stores a tag and a target instruction of a branch command. The tag represents the position of that branch command in the source instruction in which that branch command occurs. The tag also represents the remaining part of the source address of that source instruction. In response to the source address of the source instruction the set memory outputs the set of tags and target instruction selected by the source address. Tag comparison unit 22 compares these tags with the indication of the position of the branch command that has been selected by the selection unit 161 (not shown) and the remaining part of the source address received (possibly via pipeline stages) from program counter 12 (not shown). If any of the tags output by set memory 20 matches the indication of the position and the remaining part of the source address, tag comparison unit 22 outputs the corresponding target instruction.

It should be noted that in the tag the remaining part of the source address and the indication of the position of the branch command in the source instruction play the same role: information for comparison in the tag comparison unit 22. Each tag combines a remaining part of the source address and an indication of the position of the relevant branch command in the source instruction. Such a tag is stored for every target instruction (i.e. if need be using different complete tags for targets of different commands in the same source instruction). Therefore, target instructions for different branch commands in the same source instruction can be stored independently of one another in branch target memory 162. For example, the target instruction in the source instruction might be stored for one branch command, but not for another command in the same instruction, so that room is made for storing target instructions from other source instructions instead.

Set memory 20 performs the necessary actions to retrieve the set addressed by the first part of the source address during the time that branch history memory 160 reads the branch history information and/or selection unit 161 decides whether a taken branch command is predicted and, if so, at which position that branch command is located in the source instruction. That is, set memory 20 retrieves this set before the position of the relevant branch command is known. Such early reading speeds up processing. This is possible because the position of the branch command in the source instruction is only needed after reading the set, for comparison in the tag comparison unit 22.

Control unit 166 updates the content of branch history memory 160 and branch target memory 162 after execution of a source instruction by the processor. If the source instruction includes one or more branch commands, control unit 166 monitors which, if any, of these commands cause the value of the program counter to be changed. If the target instruction of the taken branch command is not yet in branch target memory 162, control unit 166 causes this target instruction to be stored in the branch target memory 162, in combination with a tag that identifies the source instruction and the position of the branch command in the instruction.

Branch history memory 160 stores information about a state that represents statistical information about previous executions of the source instruction. Preferably, branch history memory is an associative memory (e.g. fully associative, set associative or direct mapped), that can be accessed using the address of the source instruction. It will be appreciated that branch history memory 160 differs from branch target memory 162 at least in that branch target memory 162 uses both the address of the source instruction and the position of a command as an associative address, whereas branch history memory 160 uses only the address of the source instruction as associative address. Branch history memory 160 does not use the position of any command as associative address.

Control unit obtains the state stored for the source instruction from branch history memory 160 (this state is read as part of branch prediction at an earlier stage of processing the source instruction). From the state and the outcome of the branches in the source instruction control unit 166 computes an updated state. If no state is available from branch history memory, a default state is generated and used for predicting the branch and for computing the updated state.

Figure 3:
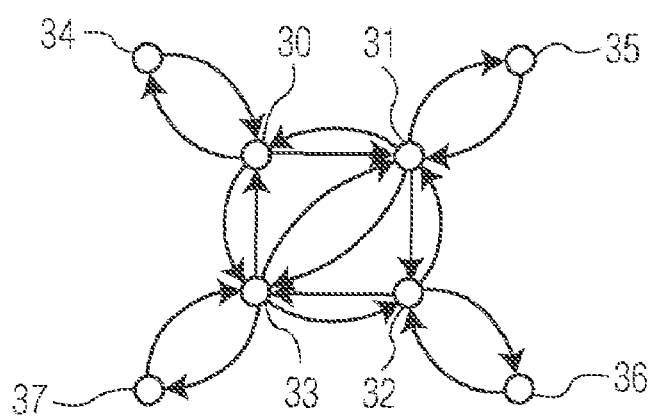
FIG. 3 shows a transition diagram of branch history states.

FIG. 3 shows an example of a state diagram of states that can be assumed by the state information in branch history memory 160 and possible transitions between these states. The example is for a processor 10, which has no more than three functional units 102a-c capable of processing branch commands in parallel. The diagram shows eight states.

The diagram shows states for prediction of a "no-branch" outcome and for a taken outcome of a branch command from a first, second or third position in the source instruction respectively. First four states 34, 35, 36, 37 represent a strong preference for the four different outcomes respectively. Second four states 30, 31, 32, 33 represent a weak preference for the four different outcomes of the branch commands respectively.

If the branch history memory 160 stores information identifying a state that represents a strong preference for an outcome of the source instruction and that outcome occurs as a result of execution, the state remains unaffected. If a different outcome occurs and the state has a strong preference, a transition is made to the state with a weak preference for the same outcome as the original state with a strong preference. If the state represents a weak preference for an outcome of the source instruction and that outcome occurs as a result of execution, a transition occurs to the state with a strong preference for the same outcome as the original state with a weak preference. If a different outcome occurs and the state has a weak preference, a transition is made to the state with a weak preference for the outcome of execution of the source instruction. If no information about a state is stored yet for an instruction, a default state is assumed for example a weak preference for the highest priority branch command in the source instruction.

Instead of a state representation, individual saturating counts could have been maintained for different positions in the source instruction of, each counting the number of taken branches or lack thereof due to a branch command in the relevant position. However, using the states shown in FIG. 3 requires less memory, because information similar to the saturating count is represented only for the preferred outcome. Of course, using more states, more gradations in preference for a preferred outcome may be expressed. In this case, the state diagram leads to even greater savings in comparison with individual counts.

Storage of information about the states in branch history memory 160 can be realized by assigning different binary labels to the various nodes. In the example of FIG. 3, 3-bit labels may be used. One way of assigning these labels is to use one bit to represent whether there is a strong or a weak preference and two bits to represent for which of the four possible outcomes there is a preference. Of course, with other state diagrams other assignments may be used, using more bits for the strength of the preference and an appropriate number of bits to distinguish the preferred outcome.

Control unit 166 receives information about the state from branch history memory 160, computes an updated state and writes back information representing the updated state to branch history memory 160. The selection unit 161 receives information about the state and selects the position in the source instruction for which this state represents a preference, if any. This selection is applied to target memory 162. Information about whether or not "no-branch" is preferred is supplied to multiplexer 164, to indicate whether the instruction from the instruction memory 14 or from the branch target memory 162 should be passed to processor 10.

The invention claimed is:

1. A branch prediction unit for implementation in a processor architecture that supports instructions including multiple branch commands, the branch prediction unit comprising:
   a branch history memory storing information about previously-executed source instructions;
   a selection unit coupled to the branch history memory, the selection unit reading the information to select a predicted branch command from a plurality of branch commands included in a current instruction and outputting a position indication indicating a location of the predicted branch command in the current instruction;
   a branch target memory comprising:
      a first input coupled to the selection unit, the first input receiving the position indication from the selection unit,
      a second input coupled to a program counter in the processor architecture, the second input receiving a source instruction address from the program counter,
      a set memory that outputs a set of target instructions, and
      a comparison unit that receives the set of target instructions from the set memory and selects an instruction corresponding to the predicted branch command from the set of target instructions based on the source instruction address received from the program counter and the position indication received from the selection unit; and
   a multiplexer coupled to the branch target memory, the multiplexer outputting the selected instruction to a processor in the processor architecture.

2. The branch prediction unit of claim 1, wherein the set memory comprises a plurality of sets, each set identified by a first portion of an address of a respective source instruction.

3. The branch prediction unit of claim 2, wherein each set comprises a plurality of memory locations, each memory location storing a tag and a target instruction of a respective branch command included in the respective source instruction.

4. The branch prediction unit of claim 3, wherein each tag comprises a position of the respective branch command in the respective source instruction and a remaining portion of the address of the respective source instruction.

5. The branch prediction unit of claim 4, wherein the set memory selects the set of target instructions outputted to the comparison unit from the plurality of sets using a first portion of the source instruction address.

6. The branch unit of claim 5, wherein the set memory selects the set of target instructions concurrently with the selection unit reading the information to select the predicted branch command.

7. The branch prediction unit of claim 1, wherein the branch history memory is an associative memory accessible by the selection unit using an address of the current instruction.

8. The branch prediction unit of claim 1, further comprising:
   a control unit that updates the branch history memory and the set memory of the branch target memory after execution of source instructions by the processor in the processor architecture.

* * * * *